United States Patent
Bailey et al.

(10) Patent No.: US 10,402,276 B2
(45) Date of Patent: *Sep. 3, 2019

(54) BACKUP TO AND CLONE FROM AN OFFSITE BACKUP LOCATION

(71) Applicant: DataStax, Santa Clara, CA (US)

(72) Inventors: Nicholas M. Bailey, Austin, TX (US); Michael Davis Bulman, Austin, TX (US); Maxim Barnash, Pyatigorsk (RU); Peter James Halliday, Chicago, IL (US)

(73) Assignee: DataStax, Santa Clara, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 14/608,051

(22) Filed: Jan. 28, 2015

(65) Prior Publication Data

US 2016/0217044 A1 Jul. 28, 2016

(51) Int. Cl.
*G06F 17/30* (2006.01)
*G06F 11/14* (2006.01)

(52) U.S. Cl.
CPC ...... *G06F 11/1451* (2013.01); *G06F 11/1464* (2013.01); *G06F 11/1469* (2013.01); *G06F 11/1471* (2013.01); *G06F 2201/80* (2013.01)

(58) Field of Classification Search
CPC ............. G06F 11/1451; G06F 11/1464; G06F 11/1469; G06F 11/1471; G06F 2201/80
See application file for complete search history.

(56) References Cited

U.S. PATENT DOCUMENTS

| | | | | |
|---|---|---|---|---|
| 2005/0055603 A1* | 3/2005 | Soran | ................... | G06F 3/0608 714/6.32 |
| 2010/0057789 A1* | 3/2010 | Kawaguchi | ......... | G06F 11/1456 707/E17.005 |
| 2010/0070726 A1* | 3/2010 | Ngo | ................... | G06F 11/1451 711/162 |
| 2010/0088279 A1* | 4/2010 | Zhang | ................ | G06F 11/1464 707/640 |
| 2011/0167221 A1* | 7/2011 | Pangal | ................ | G06F 11/1453 711/117 |
| 2013/0218840 A1* | 8/2013 | Smith | ................ | G06F 11/1446 707/639 |
| 2016/0371500 A1* | 12/2016 | Huang | ................ | G06F 21/6245 |

* cited by examiner

*Primary Examiner* — Etienne P Leroux
*Assistant Examiner* — Husam Turki Samara
(74) *Attorney, Agent, or Firm* — Gard & Kaslow LLP

(57) ABSTRACT

Various operations, functionalities and systems are described herein for backing up one or more node to an offsite location, restoring the one or more node from the offsite location, restoring the one or more node to a point-in-time (PIT) from the offsite location, cloning the one or more node from the offsite location, and cloning the one or more node to a PIT from the offsite location. Example operating contexts include one or more cluster of nodes running a NoSQL (Not only Structured Query Language) distributed database and backup, restore and/or cloning on those one or more cluster of nodes.

11 Claims, 8 Drawing Sheets

300

```
Snapshots/
    localbackup1.date.time/
        file1.locallink
        file2.locallink
    localbackup2.date.time/
        file1.locallink
        file2.locallink
        file3.locallink
CommitLogs/
    123.log.date.time
    456.log.date.time
    789.log.date.time
```

FIGURE 3

```
Snapshots/
    Node1/                                          500
        datafiles/
            file1
            file2
            file3
        offsitebackup1.date.time/
            file1.offsitelink
            file2.offsitelink
        offsitebackup2.date.time/
            file1.offsitelink
            file2.offsitelink
            file3.offsitelink
    Node2/
        datafiles/
            fileA
            fileB
            fileC
            fileD
        offsitebackup1.date.time/
            fileA.offsitelink
            fileB.offsitelink
        offsitebackup2.date.time/
            fileA.offsitelink
            fileB.offsitelink
            fileC.offsitelink
            fileD.offsitelink
Commitlogs/
    Node1/
        123.log.date.time
        456.log.date.time
        789.log.date.time
    Node2/
        321.log.date.time
        654.log.date.time
        987.log.date.time
```

FIGURE 5

BACKUP TO AND CLONE FROM AN OFFSITE BACKUP LOCATION

CROSS-REFERENCE TO RELATED APPLICATION

The present application is related to application Ser. No. 14/608,028 filed on Feb. 28, 2015.

FIELD OF THE INVENTION

The present invention relates generally to data back up, and more particularly to operations involving backing up to an offsite location.

BACKGROUND OF THE INVENTION

As businesses increasingly depend on data and data size continues to increase the importance of data backup and recovery likewise increases.

Further, data processing has moved beyond the world of monolithic data centers housing large mainframe computers with locally stored data repositories, which is easily managed and protected. Instead, today's data processing is typically spread across numerous, geographically disparate computing systems communicating across multiple networks.

One well-known distributed database example is a No-SQL (Not Only Structured Query Language) database called Cassandra, which is designed to handle big data workloads across multiple nodes with no single point of failure. Its architecture is based on the understanding that system and hardware failures can and do occur. In one sense, Cassandra addresses the problem of failures by employing a peer-to-peer distributed system across homogenous nodes where data is regularly and periodically distributed amongst all the nodes in a cluster. Referring now to FIG. 1, a simplified example of the Cassandra architecture can be seen. While oftentimes referred to as a ring architecture, fundamentally it comprises a cluster of nodes (e.g., Node 1, Node 2 and Node 3, each of which is typically running on a physically separate server computing system) communicating with each other across a network (e.g., Network 110) such as a local area network, a wide area network or the internet.

Within each node, referring now to FIG. 2, a sequentially written disk-based commit log 209 captures write activity by that node to ensure data durability. Data is then indexed and written to an in-memory (i.e., working memory 205) structure, called a memory table or a memtable 203, which resembles a write-back cache. Once the memory structure is full, in what is called a flush operation, the data is written from the memtable 203 in working memory 205 to long term storage (denoted "disk 207" although it may be a solid state device such as flash memory) in what is known as a Sorted String Table (SSTable) type data file 211. Once the data has been written to a data file 211 on disk 207 then the commit log 209 is deleted from the disk 207. As is known in the art, these SSTable data files 211 are immutable in that updates and changes are made via new memtable entries which create new SSTable data files rather than overwriting already existing SSTable data files. A process called compaction periodically consolidates SSTables, to discard old and obsolete data.

Of course, having data be created and stored locally on various nodes geographically spread across numerous locations compounds existing data backup challenges. It is therefore desirable to find a solution that addresses these various challenges.

SUMMARY OF THE INVENTION

A system and method is disclosed which provides backing up a node to an offsite location, restoring the node from the offsite location, restoring the node to a point-in-time (PIT) from the offsite location, cloning the node from the offsite location, and cloning the node to a PIT from the offsite location.

One embodiment discloses a backup method comprising: receiving a request to create an offsite backup of a node; identifying a first set of files referenced in a first local backup snapshot of the node; copying, from the node to an offsite location, each of the identified first set of files; identifying a second set of files referenced in a second local backup snapshot of the node; copying, from the node to the offsite location, each of the identified second set of files without copying from the node to the offsite location any of the identified first set of files; creating an offsite backup snapshot directory by: adding, to a first offsite backup snapshot, references to each of the first set of files at the offsite location; and adding, to a second offsite backup snapshot, references to each of the second set of files at the offsite location; receiving a request to clone, to a specified point in time, the node backed up to the offsite location; and, creating a third set of files at the cloned node from a set of log entries of a commit log of the node stored at the offsite location, the set of log entries corresponding to the specified point in time Another embodiment discloses the backup method further comprising: receiving a request to clone, to a specified point in time, the node backed up to the offsite location; and creating a third set of files at the cloned node from a set of log entries of the commit log of the node stored at the offsite location, the set of log entries corresponding to the specified point in time.

BRIEF DESCRIPTION OF THE DRAWINGS

FIG. 3 is an illustration of an example local node backup snapshot.

FIG. 5 is an illustration of an example offsite backup snapshot according to an embodiment.

DETAILED DESCRIPTION OF THE INVENTION

A method and apparatus is disclosed for backing up a node to an offsite location, restoring the node from the offsite location, restoring the node to a point-in-time (PIT) from the offsite location, cloning the node from the offsite location, and cloning the node to a PIT from the offsite location, each as described and shown herein.

Figure 1:
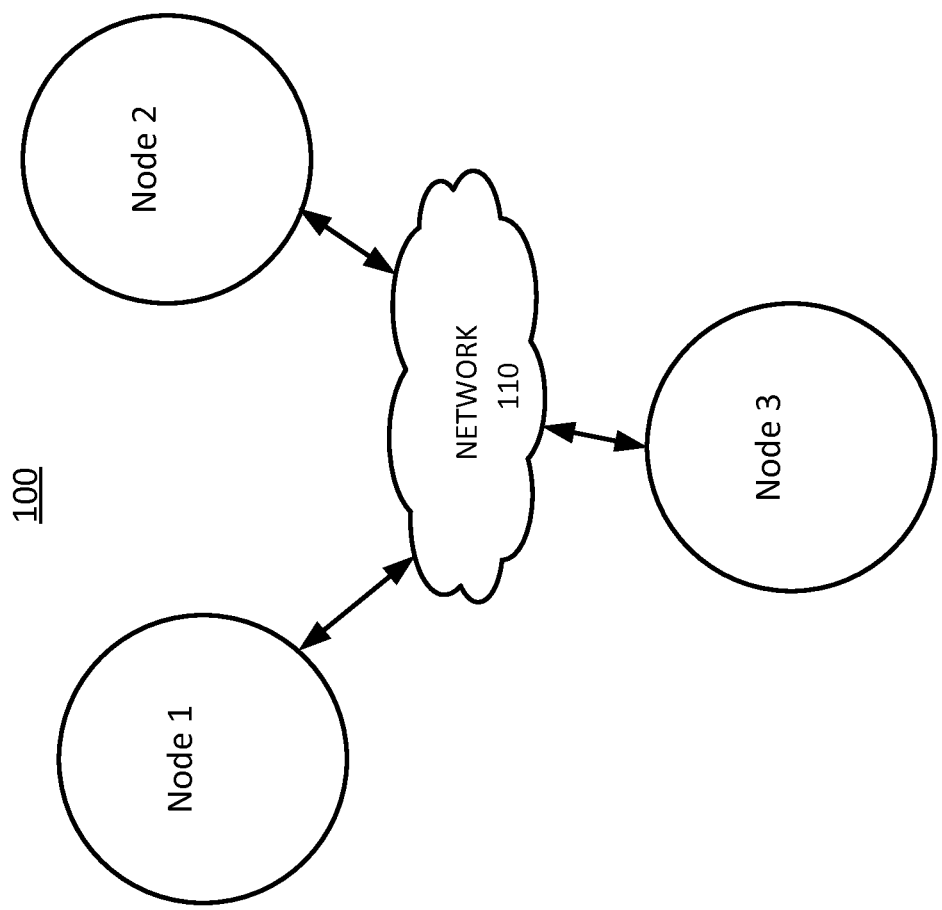
FIG. 1 is an illustration of an example Cassandra node architecture.
Figure 2:
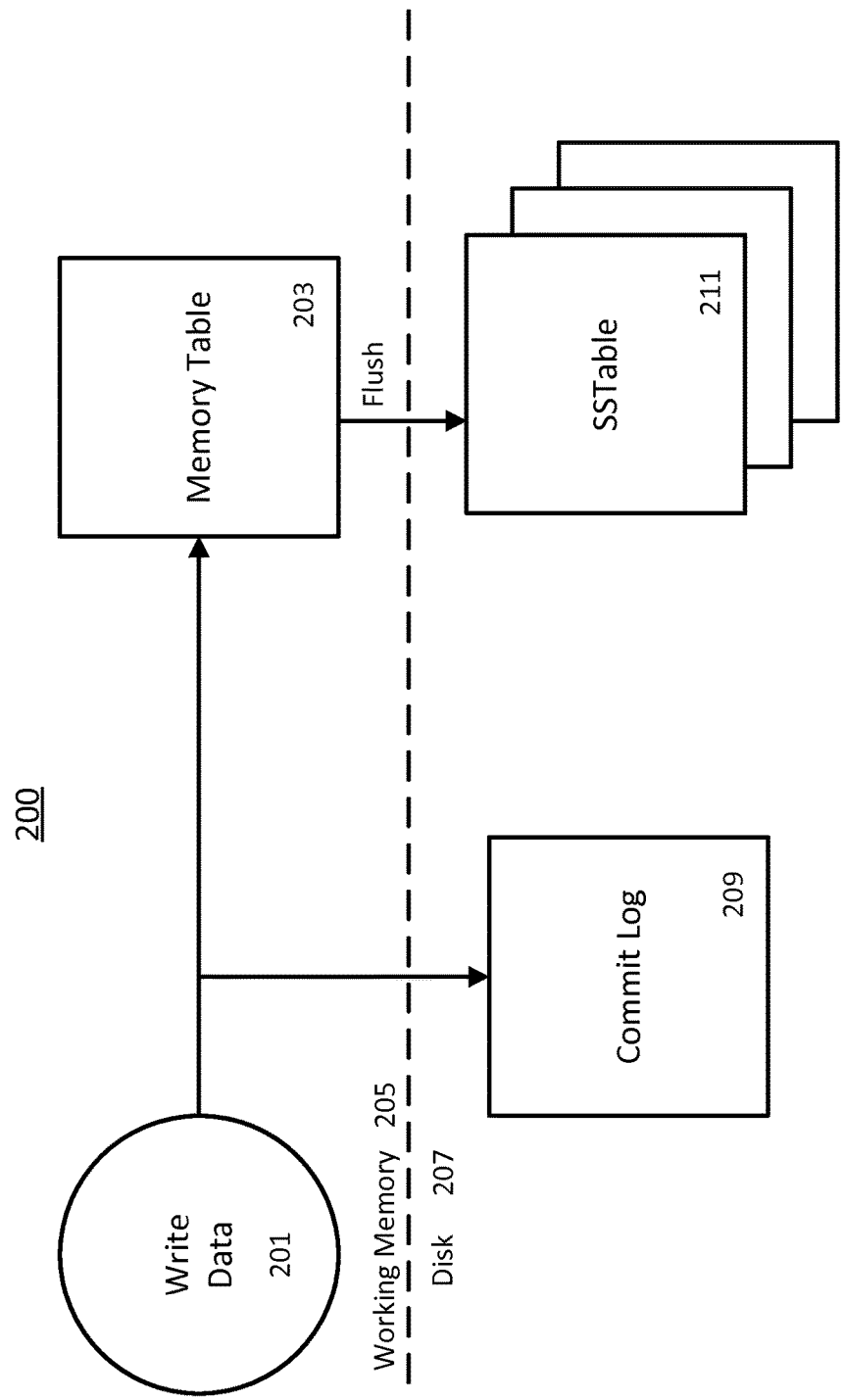
FIG. 2 is an example illustration of Cassandra's write data architecture.

Referring now to FIG. 3, an illustration of an example node backup snapshot of a local node (e.g., Node 1 of FIG. 1) can be seen. In this example, the local node backup includes two snapshot directory entries, namely localbackup1 and localbackup2 (the term "snapshot" colloquially indicates capturing an image of data files existing on the node when the backup was performed). As shown, each snapshot directory entry indicates the date and time (denoted, in the figure, in the directory entry as ".date.time") when the backup snapshot was created. As also shown, each snapshot further includes directory entries (e.g., file1.locallink and file2.locallink), which are references to data files file 1 and file 2 (e.g., SSTables 211 of FIG. 2) existing on the node when the backup snapshot was created. It is to be noted that, rather than storing duplicate copies of those data files on the node, these directory entry references (which can be in the form of links, pointers or other known data structure elements used to reference data files) simply indicate where the referenced data files are stored on disk on the node. These references are then used to locate those data files stored on the node when a restore operation is performed using a locally stored node backup snapshot Additionally, commit logs of a node can likewise be backed up on the node for later use to recreate data files. Referring again to FIG. 3, commit log directory entries 123.date.time, 456.date.time and 789.date.time are examples of such backed up commit logs of a node. However, unlike backup snapshots of immutable data files that remain ready to be backed up from disk, commit logs are typically deleted as part of the memory table to disk storage flushing operation. Therefore, backing up commit logs must be done before such deletion. This can be accomplished by coordinating their backup before or as part of such flushing operations (e.g., by the node or an agent running on the node as explained elsewhere herein).

Figure 4:
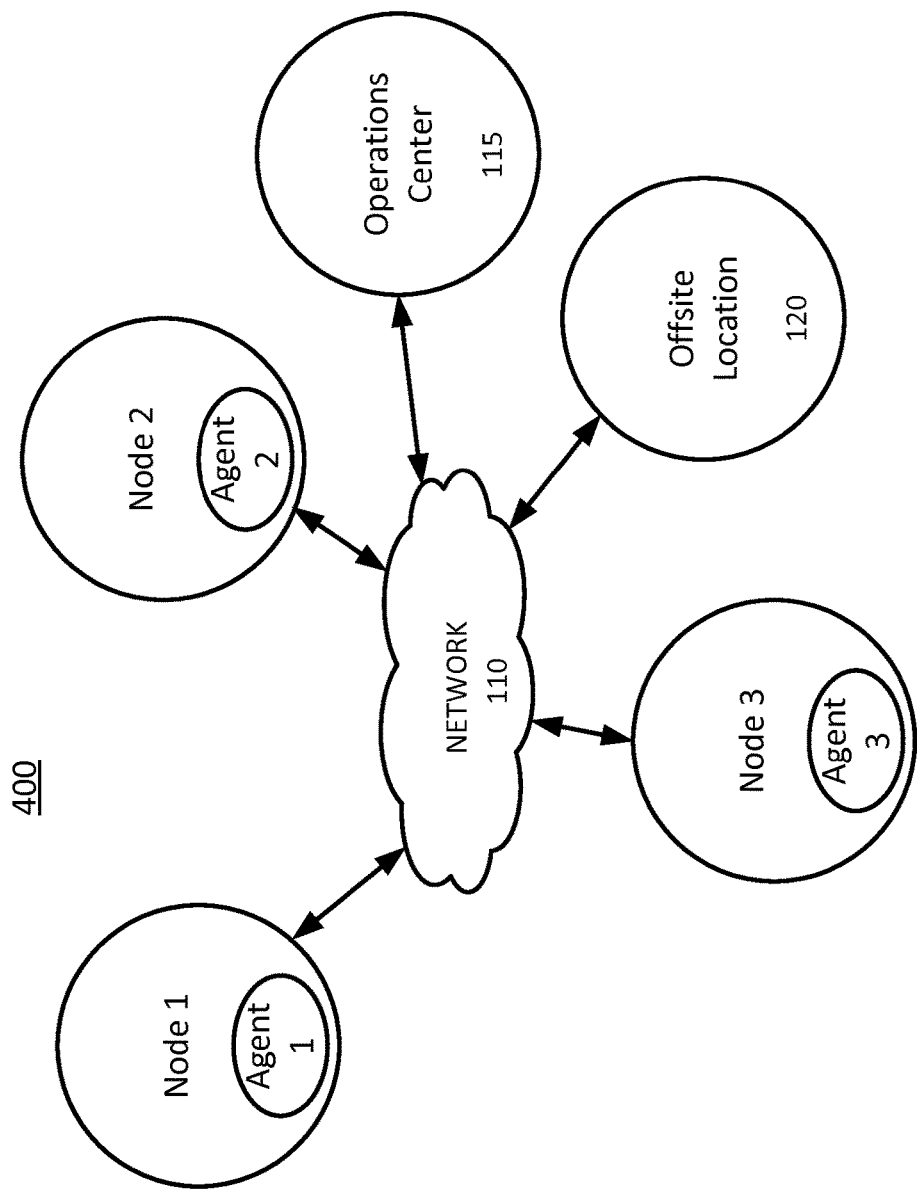
FIG. 4 is an illustration of an example Cassandra node architecture further including an offsite storage location according to an embodiment.

While such local storage of node backup snapshots has advantages, likewise there are limitations that can make backup to an offsite location desirable. Referring now to FIG. 4, an illustration of an example Cassandra node architecture further including an offsite storage location according to an embodiment can be seen. In this example, in addition to the cluster of nodes (e.g., Node 1, Node 2 and Node 3) communicating across the network 110, an offsite location 120 for storing node backup snapshots is also accessible via the network. It is to be understood that offsite location 120 can be any facility capable of storing backups received across the network and therefore includes systems such as Amazon's S3 cloud and internet storage facility. Further, in one embodiment, an Operations Center 115 is likewise in communication with the offsite location 120 and with the nodes via agents (e.g., Agent 1, Agent 2 and Agent 3) running on the nodes, each agent communicating across the network 110 with the Operations Center 115 to facilitate communications and perform the various operations described herein. It is also to be understood that in an alternative embodiment any one of the nodes, the offsite location and/or the Operations Center can be co-located with another one and can even run on the same server computing system.

When a backup from a local node to the offsite location is to be performed, each node backup snapshot on the local node is analyzed to identify the data files referenced therein. Those referenced data files are copied from the local node to the offsite location across the network without duplicating any data files already copied from the local node to the offsite location. Further, equivalents to the node backup snapshots stored on the local node are created on the offsite location by storing on the offsite location references to the data files copied to the offsite location as will now be explained.

Referring to FIG. 5, an illustration of an example offsite backup comprising multiple backup snapshots can be seen. As shown in the figure, offsite backup snapshots have been created from FIG. 3's local node backup snapshots stored on Node 1, as well as offsite backup snapshots from another node, e.g., Node 2, as will be explained.

In particular, backup snapshot localbackup1 of Node 1, which included references file1.locallink to data file file1 and file2.locallink to data file file2 stored on Node 1 (as shown in FIG. 3), has resulted in the creation of backup snapshot offsitebackup1 directory entry at the offsite location. The backup snapshot offsitebackup1 directory entry further includes, as indicated in the figure by ".date.time", the date and time the backup snapshot localbackup1 was created on the local node, rather than the date and time the offsite backup snapshot offsitebackup1 was created on the offsite location. Offsite backup snapshot offsitebackup1 also includes references, indicated as file1.offsitelink and file2.offsitelink, to where on the offsite location data files file 1 and file 2 were copied from the local node, Node 1, to the offsite location.

Further, backup snapshot localbackup2 of Node 1, which included references to data files file 1, file 2 and file 3 stored locally on Node 1, (as was shown in FIG. 3) has resulted in the creation of offsite backup snapshot offsitebackup2 directory entry at the offsite location. Likewise, the backup snapshot offsitebackup2 directory entry further includes, as indicated in the figure by ".date.time", the date and time the local backup localbackup2 was created on the local node, rather than the date and time the offsite backup snapshot offsitebackup2 was created on the offsite location. Offsite backup snapshot offsitebackup2 also includes references, indicated as file1.offsitelink, file2.offsitelink, and file3.offsitelink, to where on the offsite location data files file1, file 2, and file 3 were copied from the local node, Node 1, to the offsite location.

Still further, as shown in the figure, offsite backup snapshots of other nodes can likewise be copied across the network from those nodes and stored on the offsite location. For example, as shown in the figure, two backup snapshots of another node, Node 2, can be seen stored on the offsite location.

Further still, as also shown in the figure, node commit logs can likewise be backed up across the network to the offsite location. As shown, commit logs 123.log.date.time, 456.log.date.time and 789.log.date.time of Node 1 and commit logs 321.log.date.time, 654.log.date.time and 987.log.date.time of Node 2 have been backed up to the offsite location. Usage of these backed up commit logs is explained elsewhere herein.

Figure 6:
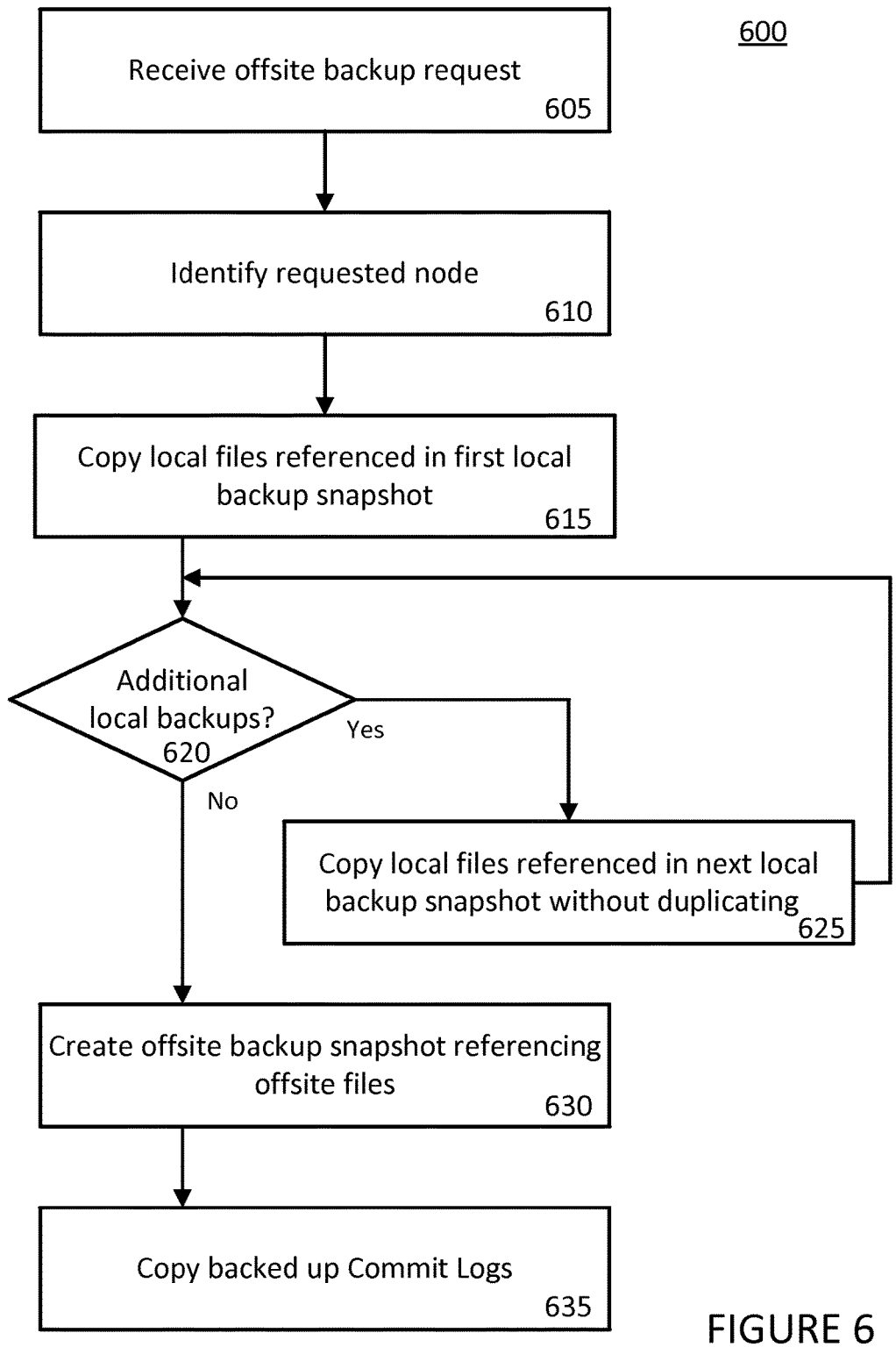
FIG. 6 is a flowchart of a process of performing a backup to an offsite location according to an embodiment.

Referring now to FIG. 6, a flowchart of a process 600 of performing a node backup to an offsite location according to an embodiment can be seen. It is to be understood that, in light of the teachings herein, this process can be repeated for other nodes in a cluster.

In an operation 605, a request to perform an offsite backup of a node is received. In one embodiment, this request can be received from a user (sometimes referred to as an administrator) operating a node or the operations center. Further, this request can be received at a node, either directly or through an agent running on that node, or at the operations center either directly or across the network from an agent running on a node.

In an operation 610, the node for which the offsite backup is to be performed is identified. In one embodiment, in the case of receiving the backup request at the node, the node is identified by the agent knowing which node the request was received on or is included in the request received by the operations center from the node or agent in operation 605.

In an operation 615, data files of a first backup snapshot of the identified node are copied from the node across the network to the offsite location. In one embodiment, this is accomplished by the node, agent or operations center locating a first backup snapshot of the identified node, identifying the data files referenced in the first backup snapshot, and copying the identified files from the identified node across the network to the offsite location. It is to be understood that the term first local backup snapshot may refer to any local backup snapshot and not necessarily to the first one ever created on that node.

In an operation 620, a determination is made regarding whether there are additional backup snapshots on the identified node. If there are additional backup snapshots then, in an operation 625, data files of a second backup snapshot of the identified node are copied from the node to the offsite location. In one embodiment, this is accomplished in the same manner as that of operation 615, however, any data files already copied from the node to the offsite location (e.g., those copied in operation 615) are not again copied to the offsite location thereby avoiding creating duplicate files at the offsite location. It is to be understood that the term additional backup snapshots may refer to any other backup snapshot on that node other than the above-referenced first local backup snapshot or, alternatively, may refer only to backup snapshots on that node created after the first local backup snapshot was created.

Operation 625 returns to operation 620 to again check for additional backup snapshots on the identified node, which can result in repeating operation 625 for yet another backup snapshot.

Once the determination is made in operation 620 that there are no additional backup snapshots on the identified node and therefore all of the data files of the identified node have been (or are in the process of being) copied from the identified node to the offsite location, the process continues with operation 630.

In an operation 630, an offsite backup snapshot for each node backup snapshot is created on the offsite location. In an embodiment, for each such backup snapshot, this is accomplished by creating an offsite backup snapshot file directory entry (e.g., offsitebackup1.date.time) with the date and time the identified node backup snapshot (e.g., localbackup1.date.time) was created on the node. Additionally, references (e.g., file1.offsitelink, file2.offsitelink) to each of the data files copied to the offsite location from the node for that node backup snapshot (or not copied if a duplicate file, as discussed above regarding operation 620) are added to the offsite backup snapshot file directory entry. Operation 630 can be performed by the node, agent or operations center.

In an optional operation 635, backed up Commit Logs of the identified node are also copied across the network to the offsite location. An example of this is shown in FIG. 5 by the Commitlogs directory entries Node1 and Node2 and the corresponding commit log files shown under each. Operation 635 can be performed by the node, agent or operations center.

As described above, process 600 of performing a node backup to an offsite location is performing an offsite backup of more than one local backup snapshot at a time. In an alternative embodiment, each individual local backup snapshot is backed up from the node to the offsite location when, or shortly after, the local backup snapshot is created at the node. In this alternative process, after initially performing operation 615 (copying data files referenced in a first local backup snapshot) followed by operation 630 (creating an offsite backup snapshot referencing those offsite files) to create an offsite backup of a node's first local backup snapshot, operation 625 (copying to the offsite location data files referenced in a subsequent local backup snapshot without duplicating them) and operation 630 (creating another offsite backup snapshot referencing those offsite files) are then performed when, or shortly after, a new local backup snapshot is created on that node. This alternative embodiment thus performs offsite backups when each local backup snapshot is taken rather than after a number of local backup snapshots have already been created.

Having now created a backup of a node to an offsite location, various additional functionalities and operations can be performed as will now be explained.

Figure 7:
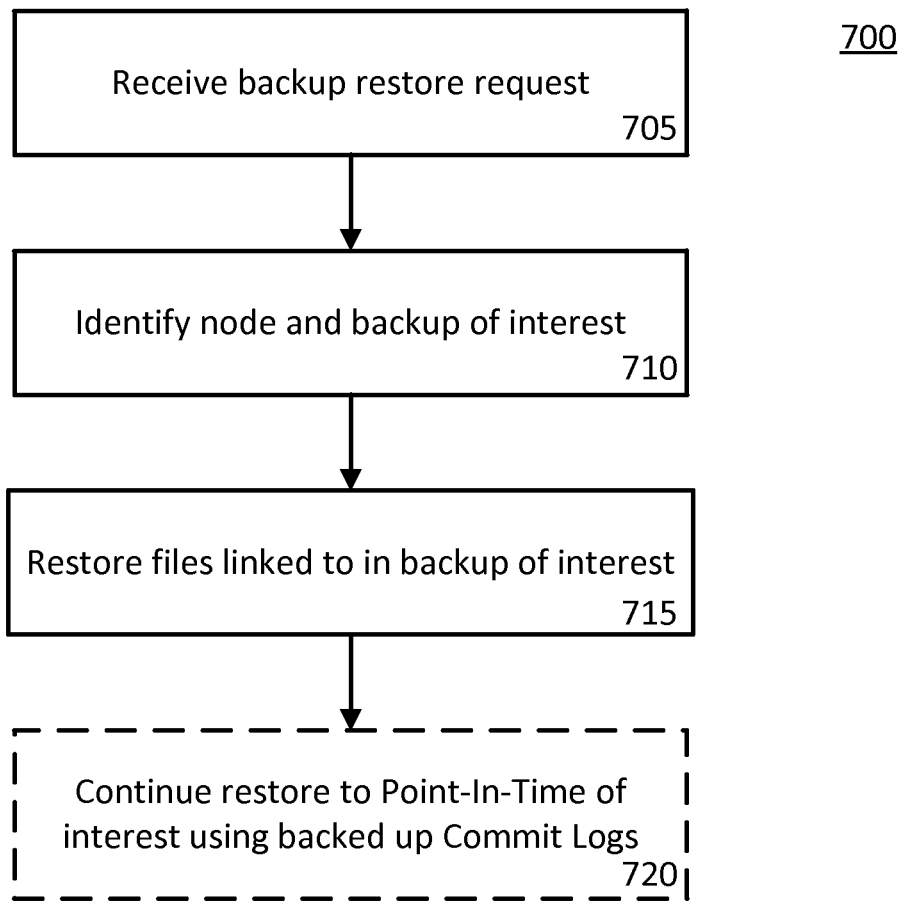
FIG. 7 is a flowchart of a process of restoring a node from a backup snapshot stored on an offsite location according to an embodiment, including optionally restoring to a point in time.

Referring now to FIG. 7, a flowchart of a process of restoring a node from a backup snapshot stored on an offsite location according to an embodiment, including optionally restoring to a specified point in time, can be seen. As the term is used herein, a restore operation returns backed up data to a node from which it came.

In an operation 705, a request to perform a node restore operation from a backup snapshot on an offsite location is received. In one embodiment, this request can be received from a user (sometimes referred to as an administrator) operating a node or the operations center. Further, this request can be received at a node, either directly or through an agent running on that node, or at the operations center either directly or across the network from an agent running on a node.

In an operation 710, the node to be restored, as well as the backup snapshot of interest, is identified. In one embodiment, in the case of receiving the restore request at the node to be restored, the node is identified by the agent knowing which node the request was received on or is included in the request received by the operations center from the node or agent in operation 705. In one embodiment, the offsite backup snapshot of interest is identified by a restore date indicating a particular date the node is to be restored to, which restore date is included in the request, either based on user input or automatically by the agent or operations center. The offsite backup snapshot having a date and time that is closest in time before the restore date is then chosen by the node, agent or operations center as the offsite backup snapshot of interest.

In an operation 715, the data files referred to in the identified backup snapshot of interest are copied from the offsite location across the network to the node to be restored, thereby restoring the node. Copying data files from the offsite location across the network to the node to be restored can be accomplished in a number of different ways, as may be desired in a given operating context or as desired by a given user. In one such way, the data files are simply copied into the filesystem of the node to be restored. In another way, an existing functionality of a given database system may be used. For example, again referring to the NoSQL Cassandra system, an existing Cassandra streaming tool known as "sstableloader" is used to stream the backed up data files from the offsite location to the node thus leaving the node to re-write the backed up data locally as new SSTable data files (and, as would be understood by one of skill in the art in light of the teachings herein, thereby accounting for data ownership in a cluster of nodes, as well as potentially different data file names and sizes, etc., yet maintaining the same underlying data). Operation 715 can be performed by the node, agent or operations center.

In an optional operation 720, a restore to a specified Point-In-Time (PIT) is performed. According to this optional operation, the particular date the node is to be restored to, as discussed above with respect to operation 710, further includes a specified (e.g., by a user, agent or operations center) point in time in or after that date to which the node restore is to be performed. Using this point in time, the node is restored beyond simply copying files referenced in the offsite backup snapshot by also recreating node data files using the offsite backup of the Commit Logs. By working sequentially through a commit log, data files which had been created on the node, between when the node backup snapshot was created and the specified point in time, but which are not part of the node backup snapshot, can be recreated either directly or via recreation of the memory table for that time period and then flushing the memory table to disk, on the node. Operation 720 can be performed by the node, agent or operations center.

Figure 8:
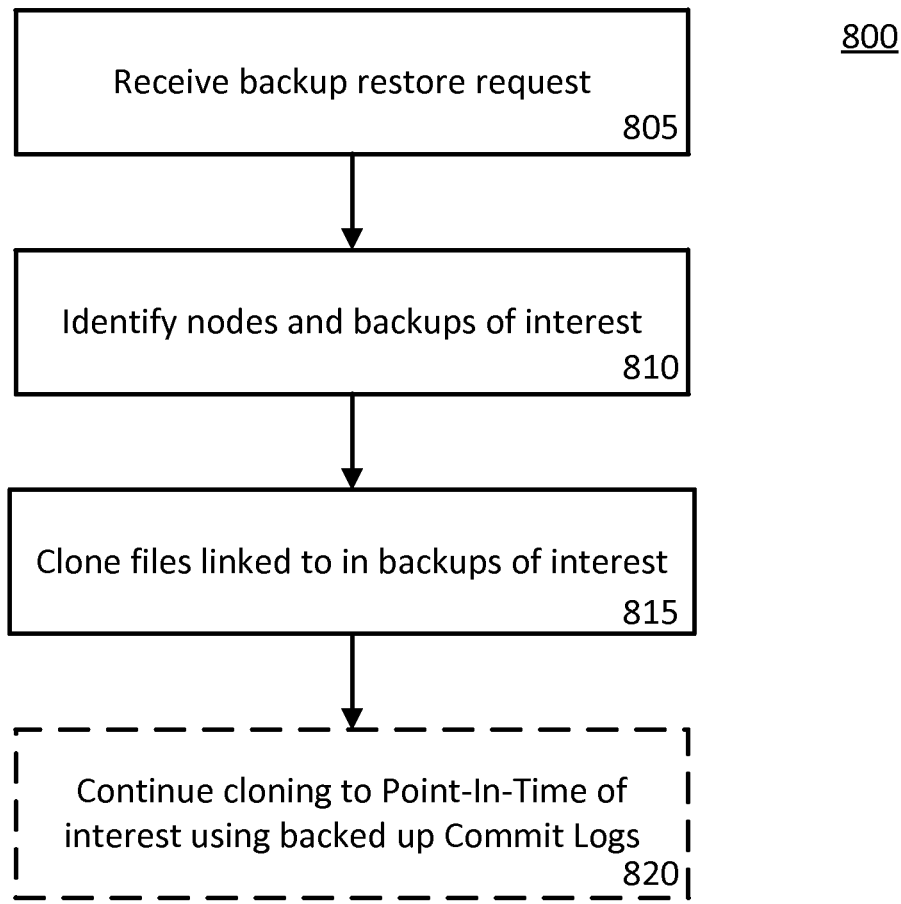
FIG. 8 is a flowchart of a process of cloning a node from a backup stored on an offsite location according to an embodiment, including optionally cloning to a point in time.

Referring now to FIG. 8, a flowchart of a process of cloning a node from a backup snapshot stored on an offsite location according to an embodiment, including optionally restoring to a specified point in time, can be seen. As the term is used herein, a clone operation places data backed up from one node onto some other node.

In an operation 805, a request to perform a node clone operation from a backup snapshot on an offsite location is received. In one embodiment, this request can be received from a user (sometimes referred to as an administrator) operating a node different than the node to be cloned or the operations center. Further, this request can be received at a node different than the node to be cloned, either directly or through an agent running on that node, or at the operations center either directly or across the network from an agent running on that node.

In an operation 810, the node to be cloned, as well as the offsite backup snapshot of interest, is identified. In one embodiment, the node to be cloned is identified by being included in the request received by the operations center in operation 805. In one embodiment, the backup snapshot of interest is identified by a restore date indicating a particular date of the node to be cloned, which clone date is included in the request, either based on user input or generated automatically by the agent or operations center. The offsite backup snapshot, of the node to be cloned, having a date and time closest in time preceding the clone date is then chosen by the node, agent or operations center as the offsite backup snapshot of interest In an operation 815, the data files referenced in the identified backup snapshot of interest are copied from the offsite location across the network to the node different than the backed up node to be cloned, thereby cloning the backed up node. Operation 815 can be performed in essentially the same manner as operation 715 described above, now copying to the node being cloned to rather than to the backed up node. Operation 815 can be performed by the node, agent or operations center.

In an optional operation 820, a clone operation to a specified Point-In-Time (PIT) is performed. According to this optional operation, the particular date the node is to be cloned to, as discussed above with respect to operation 810, further includes a specified (e.g., by a user, agent or operations center) point in time in or after that date to which the node cloning is to be performed. Using this point in time, the node is cloned beyond simply copying files referenced in the offsite backup snapshot by also recreating node data files using the offsite backup of the Commit Logs. By working sequentially through a commit log, data files which had been created on the node, between when the node backup snapshot of the node being cloned was created and the specified point in time, but which are not part of the node backup snapshot, can be recreated either directly or via recreation of the memory table for that time period and then flushing the memory table to disk, on the node being cloned to. Operation 820 can be performed by the node, agent or operations center.

It is to be understood that while the above operations and functionalities have been described with respect to a single node (either backing up and restoring to a single node or backing up from a single node and cloning that node to another node), they are equally applicable to clusters (e.g., multiple) of nodes. For example, each node in a cluster of nodes can similarly be backed up to an offsite location and then restored from that offsite backup. Similarly each node in a cluster of nodes can be backed up to an offsite location and then cloned to another cluster of nodes from that offsite backup. Performing the various operations described herein may therefore be part of a process to backup, restore and/or clone a cluster of nodes. As such, various statements herein referring to operations on or with a node are likewise intended to cover operations on or with a node of a cluster or a cluster of nodes, as would be understood by one of skill in the art in light of the teachings herein. Further, any ownership of data by a node in a cluster, as occurs in a Cassandra database system, will likewise be addressed as needed for a given operation. For example, in performing a clone operation to a specified PIT, such data ownership can be addressed by using all commit logs for the relevant time period, which were backed up to the offsite location from the various nodes in the cluster, to recreate the node data files up until the specified point in time on the node being cloned to, or alternatively the recreated data is also sent to whichever node(s) in the cluster own the data.

It is also to be understood that the number of nodes in a cluster of nodes can change between when the cluster of nodes was backed up and when the cluster of nodes is being restored. This would create a mismatch between the number of nodes backed up and the number of nodes being restored. In such an event, in one embodiment, the restore operation restores each one of the backed up nodes to one of the nodes of the cluster in either a random or round robin fashion. If the number of nodes in the cluster being restored is greater than the number of nodes in the cluster when it was backed up (i.e., the number of nodes in the cluster has increased), then some of the nodes in the cluster being restored do not receive any of the backed up data files as part of the restore operation. Likewise, if the number of nodes in the cluster being restored is less than the number of nodes in the cluster when it was backed up (i.e., the number of nodes in the cluster has decreased), then some of the nodes in the cluster being restored receive more of the backed up data files as part of the restore operation than some of the other nodes in the cluster being restored.

Similarly, it also is to be understood that in the event of a cloning operation, the number of nodes in a first cluster of nodes that was backed up can be different than the number of nodes in a second cluster to which the first cluster is being cloned. This would create a mismatch between the number of nodes backed up and the number of nodes being cloned to. In such an event, in one embodiment, the cloning operation clones each one of the backed up nodes of the first cluster to one of the nodes of the second cluster in either a random or round robin fashion. If the number of nodes in the second cluster being cloned to is greater than the number of nodes in the first cluster when it was backed up, then some of the nodes in the second cluster being cloned to do not receive any of the backed up data files of the first cluster as part of the cloning operation. Likewise, if the number of nodes in the second cluster being cloned to is less than the number of nodes in the first cluster when it was backed up, then some of the nodes in the second cluster receive more of the backed up data files as part of the cloning operation than some of the other nodes in the second cluster.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result of performance of all of the described steps.

There may be a single computing system, server or processor, or multiple computing systems, servers or processors performing different functions of the functions described herein. One of skill in the art will appreciate how to determine which and how many of each will be appropriate for a specific intended application.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

These and other variations upon the embodiments described and shown herein are intended to be covered by the present disclosure, which is limited only by the appended claims.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of backup and cloning multiple local backup snapshots located on a node, wherein each of the local backup snapshots comprises references to where existing files are stored on the node rather than copies of the files, the backup and cloning method comprising:

receiving a request to create an offsite backup;

identifying, by a computing system, a first set of files referenced in a first of the multiple local backup snapshots located on the node, wherein the first set of files existed on the node when the first of the multiple local backup snapshots was created;

copying, by the computing system, from the node to an offsite location, each of the identified first set of files;

identifying, by the computing system, a second set of files referenced in a second of the multiple local backup snapshots located on the node, wherein the second set of files existed on the node when the second of the multiple local backup snapshots was created;

copying, by the computing system, from the node to the offsite location, each of the identified second set of files without copying from the node to the offsite location any of the identified first set of files;

creating, by the computing system, an offsite backup snapshot directory located at the offsite location by:
 adding, to a first offsite backup snapshot located at the offsite location, references to each of the first set of files at the offsite location;
 and,
 adding, to a second offsite backup snapshot located at the offsite location, references to each of the second set of files at the offsite location;

receiving a request to clone at a clone node the node backed up to the offsite location;

identifying, by the computing system, from the first offsite backup snapshot, each of the first set of files referenced at the offsite location;

copying, by the computing system, each of the first set of files from the offsite location to the clone node;

identifying, by the computing system, from the second offsite backup snapshot, each of the second set of files referenced at the offsite location;

and, copying, by the computing system, each of the second set of files from the offsite location to the clone node without copying from the offsite location to the clone node any of the first set of files.

2. The method of claim 1 further comprising saving at the offsite location an indication of the node for the copied first set of files, the copied second set of files, and the created offsite backup snapshot directory.

3. The method of claim 1 further comprising copying, from the node to the offsite location, a commit log of the node.

4. The method of claim 3, further comprising:

receiving a request to clone, to a specified point in time, the node backed up to the offsite location;

and creating a third set of files at the clone node from a set of log entries of the commit log of the node stored at the offsite location, the set of log entries corresponding to the specified point in time.

5. The method of claim 1 wherein the offsite location is a cloud-based storage facility.

6. The method of claim 1 wherein the offsite location is user specified.

7. The method of claim 1 wherein the request to clone is user specified.

8. The method of claim 1 wherein the request to create an offsite backup is system generated.

9. The method of claim 1 wherein each of the first set of files and the second set of files comprises Sorted String Tables.

10. A non-transitory computer-readable storage medium having embodied thereon a program, the program being executable by a processor to perform a method of backup and cloning multiple local backup snapshots located on a node, wherein each of the local backup snapshots comprises references to where existing files are stored on the node rather than copies of the files, the backup and cloning method comprising the steps of:

receiving a request to create an offsite backup;

identifying a first set of files referenced in a first of the multiple local backup snapshots located on the node, wherein the first set of files existed on the node when the first of the multiple local backup snapshots was created;

copying, from the node to an offsite location, each of the identified first set of files;

identifying a second set of files referenced in a second of the multiple local backup snapshots located on the node, wherein the second set of files existed on the node when the second of the multiple local backup snapshots was created;

copying, from the node to the offsite location, each of the identified second set of files without copying from the node to the offsite location any of the identified first set of files;

creating an offsite backup snapshot directory located at the offsite location by:

adding, to a first offsite backup snapshot located at the offsite location, references to each of the first set of files at the offsite location;

and, adding, to a second offsite backup snapshot located at the offsite location, references to each of the second set of files at the offsite location;

receiving a request to clone at a clone node the node backed up to the offsite location;

identifying, from the first offsite backup snapshot, each of the first set of files referenced at the offsite location;

copying, each of the first set of files from the offsite location to the clone node;

identifying, from the second offsite backup snapshot, each of the second set of files referenced at the offsite location;

and, copying each of the second set of files from the offsite location to the clone node without copying from the offsite location to the clone node any of the first set of files.

11. The non-transitory computer readable storage medium of claim 10, wherein the method further comprises the steps of:

receiving a request to clone, to a specified point in time, the node backed up to the offsite location;

and, creating a third set of files at the clone node from a set of log entries of the commit log of the node stored at the offsite location, the set of log entries corresponding to the specified point in time.

* * * * *